US012488285B2

(12) United States Patent
O'Hara

(10) Patent No.: US 12,488,285 B2
(45) Date of Patent: Dec. 2, 2025

(54) CATEGORY CLASSIFICATION SYSTEM FOR FEATURE CONTRIBUTION SCORES

(71) Applicant: Business Objects Software LTD, Dublin (IE)

(72) Inventor: Paul O'Hara, Dublin (IE)

(73) Assignee: Business Objects Software LTD, Dublin (IE)

(*) Notice: Subject to any disclaimer, the term of this patent is extended or adjusted under 35 U.S.C. 154(b) by 564 days.

(21) Appl. No.: 18/059,852

(22) Filed: Nov. 29, 2022

(65) Prior Publication Data
US 2024/0193462 A1 Jun. 13, 2024

(51) Int. Cl.
*G06N 20/00* (2019.01)
*G06F 18/214* (2023.01)

(52) U.S. Cl.
CPC ........... *G06N 20/00* (2019.01); *G06F 18/214* (2023.01)

(58) Field of Classification Search
None
See application file for complete search history.

(56) References Cited

U.S. PATENT DOCUMENTS

| | | | | |
|---|---|---|---|---|
| 11,868,852 | B1* | 1/2024 | Watson | G06N 20/00 |
| 2018/0293292 | A1* | 10/2018 | Odibat | G06F 16/9535 |
| 2019/0303716 | A1* | 10/2019 | Marwah | G06F 18/2135 |
| 2020/0272913 | A1* | 8/2020 | Yu | G06N 20/00 |
| 2022/0156519 | A1 | 5/2022 | Ghorbani et al. | |
| 2022/0366315 | A1* | 11/2022 | Desreumaux | G06N 5/01 |
| 2024/0062101 | A1* | 2/2024 | O'Hara | G06N 20/20 |
| 2024/0135260 | A1* | 4/2024 | De | G06N 5/01 |

OTHER PUBLICATIONS

Chawla et al., SMOTE: Synthetic Minority Over-sampling Technique, 2002, Journal of Artificial Intelligence Research 16, 321-357 ( Year: 2002).
Anwaar, Machine Learning Tutorial—Feature Engineering Tabular Data, Aug. 23, 2021, Medium, p. 1-11 (Year: 2021).

* cited by examiner

*Primary Examiner* — Ryan Barrett
(74) *Attorney, Agent, or Firm* — Fountainhead Law Group, PC

(57) ABSTRACT

A system may obtain a plurality of historical feature contribution score (FCS) datasets, each historical FCS dataset comprising a first plurality of feature contribution scores and a size of the historical FCS dataset. The system may apply default feature contribution category classification (FCCC) parameters to the plurality of historical FCS datasets and may optimize the default FCCC parameters to produce a plurality of optimized FCCC parameters. The system may produce a training dataset comprising the optimized FCCC parameters and use the training dataset to train a machine learning model to apply the category classification labels. The system may apply the new FCS dataset to the machine learning model, the new FCS dataset comprising a second plurality of feature contribution scores and a size of the new FCS dataset, and provide the category classification labels for the new FCS dataset to a user interface.

20 Claims, 15 Drawing Sheets

FIG. 8A

| | Influence | Column | Correlations |
|---|---|---|---|
| ○○○ | STRONG | Recent Form | Athlete Previous Runs |
| ○ | WEAK | Athlete ID | - |
| ○ | WEAK | Athlete Age | - |
| ○○ | MODERATE | Athlete Experience | Recent Form, Athlete Previous Runs |

| Category Classification Label | Absolute Threshold |
|---|---|
| Weak | ≥ 0.0 and < 0.22 |
| Moderate | ≥ 0.22 and < 0.5 |
| Strong | ≥ 0.5 |

852 — 854
850

| Feature Contribution Score Set Size | Category Classification Label | Derived Threshold |
|---|---|---|
| 4 | Weak | ≥ 0.0 and < 0.1534 |
| 4 | Moderate | ≥ 0.21534 and < 0.3488 |
| 4 | Strong | ≥ 0.3488 |
| 15 | Weak | ≥ 0.0 and < 0.0756 |
| 15 | Moderate | ≥ 0.0756 and < 0.1719 |
| 15 | Strong | ≥ 0.1719 |

FIG. 8C

| Feature Contribution Score Set ID | Contribution Score | Contribution Score Set Size | Expected Classification | Absolute Threshold Application Classification | Applied Algorithm Classification |
|---|---|---|---|---|---|
| A1 | 0.6767 | 4 | Strong | Strong | Strong |
| A1 | 0.1730 | 4 | Moderate | Weak | Moderate |
| A1 | 0.1374 | 4 | Weak | Weak | Weak |
| A1 | 0.0127 | 4 | Weak | Weak | Weak |
| B1 | 0.2044 | 15 | Strong | Weak | Strong |
| B1 | 0.1901 | 15 | Strong | Weak | Strong |
| B1 | 0.1414 | 15 | Moderate | Weak | Moderate |
| B1 | 0.1048 | 15 | Moderate | Weak | Moderate |
| B1 | 0.0770 | 15 | Moderate | Weak | Moderate |
| B1 | 0.0419 | 15 | Weak | Weak | Weak |
| B1 | 0.0413 | 15 | Weak | Weak | Weak |
| B1 | 0.0385 | 15 | Weak | Weak | Weak |
| B1 | 0.0358 | 15 | Weak | Weak | Weak |
| B1 | 0.0303 | 15 | Weak | Weak | Weak |
| B1 | 0.0234 | 15 | Weak | Weak | Weak |
| B1 | 0.0221 | 15 | Weak | Weak | Weak |
| B1 | 0.0215 | 15 | Weak | Weak | Weak |
| B1 | 0.0134 | 15 | Weak | Weak | Weak |
| B1 | 0.0133 | 15 | Weak | Weak | Weak |

FIG. 9

| Feature Contribution Set Size (1002) | Count Contribution Sets (1004) | Accuracy - Applied Algorithm (1006) | Accuracy - Applied Threshold (1008) |
|---|---|---|---|
| 2 | 28 | 0.982214286 | 0.982143 |
| 3 | 28 | 0.988095238 | 0.821429 |
| 4 | 40 | 0.968750000 | 0.693750 |
| 5 | 28 | 0.957142857 | 0.700000 |
| 6 | 24 | 0.909722222 | 0.631944 |
| 7 | 40 | 0.939285714 | 0.617857 |
| 8 | 36 | 0.958333333 | 0.631944 |
| 9 | 36 | 0.962962963 | 0.57716 |
| 10 | 72 | 0.961111111 | 0.580556 |
| 11 | 44 | 0.969008264 | 0.561983 |
| 12 | 40 | 0.991666667 | 0.618750 |
| 13 | 32 | 0.975961538 | 0.617788 |
| 14 | 40 | 0.928571429 | 0.605357 |
| 15 | 44 | 0.924242424 | 0.583333 |
| 16 | 52 | 0.860576923 | 0.533654 |
| 17 | 52 | 0.884615385 | 0.573529 |
| 18 | 40 | 0.866666667 | 0.561111 |
| 19 | 40 | 0.913157895 | 0.615789 |
| 20 | 40 | 0.852500000 | 0.585000 |
| 25 | 60 | 0.893333333 | 0.641333 |
| 30 | 52 | 0.875641026 | 0.664103 |
| 35 | 76 | 0.892105263 | 0.719173 |
| 40 | 64 | 0.873437500 | 0.714844 |
| 45 | 40 | 0.863333333 | 0.728333 |
| 50 | 52 | 0.855384615 | 0.753462 |
| 60 | 48 | 0.872222222 | 0.781944 |
| 70 | 36 | 0.875396825 | 0.837698 |
| 80 | 32 | 0.851562500 | 0.832422 |
| 90 | 32 | 0.855902778 | 0.839931 |
| 100 | 60 | 0.865166667 | 0.859500 |
| 110 | 36 | 0.856818182 | 0.853788 |
| 120 | 56 | 0.903422619 | 0.902530 |
| 130 | 24 | 0.928846154 | 0.928526 |
| 140 | 28 | 0.965306122 | 0.965051 |
| 150 | 24 | 0.968611111 | 0.968611 |
| 160 | 24 | 0.975520833 | 0.975521 |
| 170 | 16 | 0.973897059 | 0.973897 |
| 180 | 16 | 0.984027778 | 0.984028 |
| 190 | 20 | 0.988157895 | 0.988158 |
| 200 | 20 | 0.975750000 | 0.975250 |
| | Average Accuracy | 0.91 | 0.74 |
| | Standard Deviation | 0.049 | 0.152 |

FIG. 10

| Feature Contribution Set Size | Accuracy - Applied Algorithm | Accuracy - Absolute Threshold | Algorithm ≥ Threshold |
|---|---|---|---|
| 2 | 1 | 0.933333333 | 1 |
| 3 | 0.96875 | 1 | 1 |
| 4 | 1.000000000 | 1 | 1 |
| 5 | 0.919354839 | 1 | 1 |
| 6 | 0.891891892 | 1 | 1 |
| 7 | 0.940789474 | 1 | 1 |
| 8 | 0.932926829 | 1 | 1 |
| 9 | 0.956284153 | 1 | 1 |
| 10 | 0.968899522 | 1 | 1 |
| 11 | 0.996323529 | 1 | 1 |
| 12 | 0.989898990 | 1 | 1 |
| 13 | 0.964980545 | 1 | 1 |
| 14 | 0.969969970 | 1 | 1 |
| 15 | 1 | 1 | 1 |
| 16 | 1 | 1 | 1 |
| 17 | 1 | 1 | 1 |
| 18 | 0.980099502 | 1 | 1 |
| 19 | 1 | 1 | 1 |
| 20 | 0.965811966 | 1 | 1 |
| 25 | 1 | 1 | 1 |
| 30 | 1 | 1 | 1 |
| 35 | 1 | 1 | 1 |
| 40 | 1 | 1 | 1 |
| 45 | 1 | 1 | 1 |
| 50 | 1 | 1 | 1 |
| 60 | 1 | 1 | 1 |
| 70 | 1 | 1 | 1 |
| 80 | 1 | 1 | 1 |
| 90 | 1 | 1 | 1 |
| 100 | 1 | 1 | 1 |
| 110 | 1 | 1 | 1 |
| 120 | 1 | 1 | 1 |
| 130 | 1 | 1 | 1 |
| 140 | 1 | 1 | 1 |
| 150 | 1 | 1 | 1 |
| 160 | 1 | 1 | 1 |
| 170 | 1 | 1 | 1 |
| 180 | 1 | 1 | 1 |
| 190 | 1 | 1 | 1 |
| 200 | 1 | 1 | 1 |
| Average Accuracy | 0.98 | 0.99 | |
| Standard Deviation | 0.02 | 0.0100 | |

FIG. 11

| Feature Contribution Set Size | Accuracy - Applied Algorithm | Accuracy - Absolute Threshold | Algorithm ≥ Threshold |
|---|---|---|---|
| 2 | 1 | 1 | 1 |
| 3 | 1 | 0.952380952 | 1 |
| 4 | 0.962962963 | 0.574074074 | 1 |
| 5 | 1 | 0.617021277 | 1 |
| 6 | 0.875000000 | 0.375000000 | 1 |
| 7 | 0.973333333 | 0.240000000 | 1 |
| 8 | 0.985915493 | 0.126760563 | 1 |
| 9 | 0.959595960 | 0.040404040 | 1 |
| 10 | 0.969696970 | 0 | 1 |
| 11 | 0.968750000 | 0 | 1 |
| 12 | 0.992907801 | 0 | 1 |
| 13 | 0.991735554 | 0 | 1 |
| 14 | 0.888235294 | 0.035294118 | 1 |
| 15 | 0.839285714 | 0 | 1 |
| 16 | 0.711246201 | 0 | 1 |
| 17 | 0.756923077 | 0 | 1 |
| 18 | 0.746212121 | 0.007575758 | 1 |
| 19 | 0.750000000 | 0 | 1 |
| 20 | 0.665562914 | 0 | 1 |
| 25 | 0.691119691 | 0 | 1 |
| 30 | 0.624758221 | 0 | 1 |
| 35 | 0.611637348 | 0 | 1 |
| 40 | 0.552486188 | 0 | 1 |
| 45 | 0.497950820 | 0 | 1 |
| 50 | 0.414062500 | 0 | 1 |
| 60 | 0.414012739 | 0 | 1 |
| 70 | 0.232273839 | 0 | 1 |
| 80 | 0.114219114 | 0 | 1 |
| 90 | 0.099783080 | 0 | 1 |
| 100 | 0.040332147 | 0 | 1 |
| 110 | 0.020725389 | 0 | 1 |
| 120 | 0.009160305 | 0 | 1 |
| 130 | 0.004484305 | 0 | 1 |
| 140 | 0.007299270 | 0 | 1 |
| 150 | 0 | 0 | 1 |
| 160 | 0 | 0 | 1 |
| 170 | 0 | 0 | 1 |
| 180 | 0 | 0 | 1 |
| 190 | 0 | 0 | 1 |
| 200 | 0.020202020 | 0 | 1 |
| Average Accuracy | 0.5348 | 0.0992 | |
| Standard Deviation | 0.3966 | 0.2470 | |

FIG. 12

CATEGORY CLASSIFICATION SYSTEM FOR FEATURE CONTRIBUTION SCORES

TECHNICAL FIELD

Embodiments generally relate to machine learning models, and more particularly to improving machine learning models using automatic category classification of a feature contribution score.

The integration of machine learning into enterprise systems data analytics offerings has increased, making the provision of machine learning augmented services a key component of modern enterprise systems data analytics offerings. Machine learning (ML) augmented analytic systems may provide meaningful insights to organizations across large sets of data, which, if done manually, would be very time-consuming. Thus, ML augmented analytic systems enable improved decision making within the organization while increasing efficiency.

However, utilizing machine learning may require highly skilled individuals to prepare data, train machine learning models, interpret results, and disseminate findings. There is a need for data analytic applications that provide features enabling non machine learning experts to easily utilize machine learning functionality.

SUMMARY

Disclosed embodiments address the above-mentioned problems by providing one or more non-transitory computer-readable media storing computer-executable instructions that, when executed by at least one processor, perform a method for applying category classification labels to a new feature contribution score dataset, the method including: obtaining a plurality of historical feature contribution score (FCS) datasets, each historical FCS dataset including a first plurality of feature contribution scores and a size of the historical FCS dataset, applying default feature contribution category classification (FCCC) parameters to the plurality of historical FCS datasets; optimizing the default FCCC parameters to produce a plurality of optimized FCCC parameters; producing a training dataset including the optimized FCCC parameters; and using the training dataset to train a machine learning model to apply the category classification labels; applying the new FCS dataset to the machine learning model, the new FCS dataset including a second plurality of feature contribution scores and a size of the new FCS dataset; and providing the category classification labels for the new FCS dataset to a user interface.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE FIGURES

Embodiments are described in detail below with reference to the attached drawing figures, wherein:

FIG. 8A illustrates an exemplary information panel on a user interface.

FIG. 8B illustrates an exemplary table with absolute thresholds.

FIG. 8C illustrates an exemplary table with derived thresholds.

FIG. 9 illustrates an exemplary simulated historical input feature contribution score dataset containing two feature contribution score sets with classification labels.

FIG. 10 illustrates an example comparison of the application of the feature contribution category classification algorithm and the absolute fixed thresholds against the augmented feature contribution score dataset.

FIG. 11 displays the results from the example comparison of the application of the feature contribution category classification algorithm and the absolute fixed thresholds against the augmented feature contribution score dataset for the category classification label "Low".

FIG. 12 displays the results from the example comparison of the application of the feature contribution category classification algorithm and the absolute fixed thresholds against the augmented feature contribution score dataset for category classification label, "Moderate".

Figure 1:
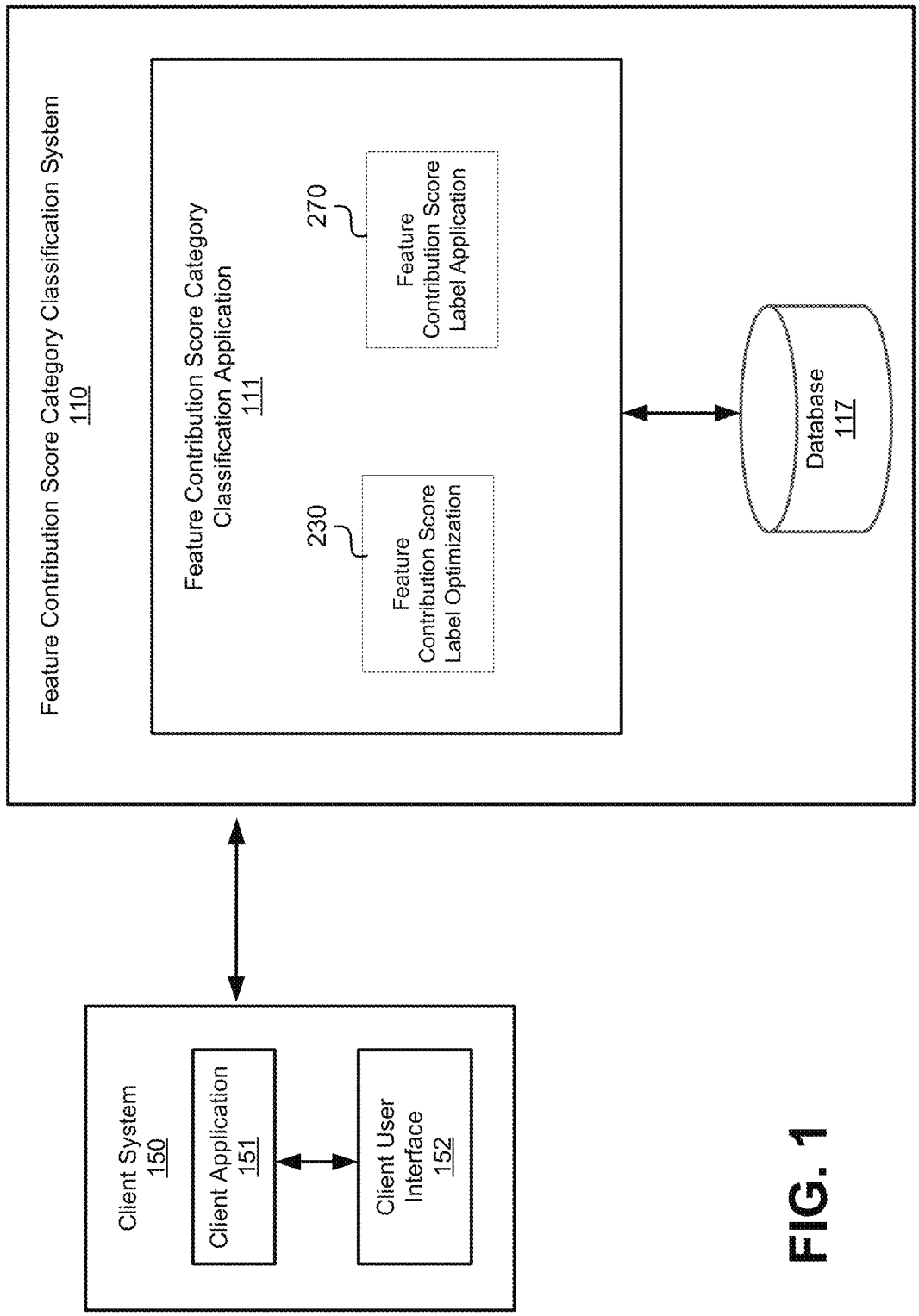
FIG. 1 shows a feature contribution score category classification system in communication with a client system, according to an embodiment.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

Data analytic applications may provide features enabling non machine learning experts to utilize machine learning functionality. Such applications may cover machine learning related tasks such as joining data, data cleaning, engineering additional features, machine learning model building, and interpretation of machine learning results.

Joining data refers to combining data from multiple distinct sources into a unified dataset from which further analysis can be performed. Enterprise systems employ various approaches to automatically suggest joining of data, including fuzzy matching, etc.

In general, incorrect or inconsistent data can lead to false conclusions. Data cleaning involves detecting and correcting corrupt or inaccurate records from a dataset. Once data cleaning process is complete, the data may be said to be in a consistent state and of high quality. Certain systems offer various tooling enabling the efficient identification and correction of inaccuracies in the data. Identification and correction of inaccuracies may include inferring data types, identifying linked data, standardizing data, and managing missing values.

Inferring data types may involve automatically identifying and setting the data type for the features of the data. For example, automatically ensuring numbers are stored as the correct numerical data type.

Often a value can be entered in many ways across system. For example, an address may be entered in various formats. Identifying linked data may involve techniques such as fuzzy matching, which can automatically suggest possible linked value items within the data, thereby allowing confirmation and mapping of the linked value items to a standard common value item.

Standardizing data may involve automatically placing data in a standardized format. For instance, setting all textual entries to be lower or uppercase. For numerical data, standardizing could ensure all values utilize a common measurement unit, for example grams.

Missing values often occur in data. Managing missing values may involve automatically providing several options to users on how to manage the missing data, such as dropping the data from the dataset, imputing the missing data using existing data, or flagging the data as missing.

Engineering additional features is another machine learning task that data analytic applications may enable non-expert users to utilize. Engineering of additional features may involve a further round of data preparation performed on the data (e.g., the cleaned data). Feature engineering may involve extracting additional columns (features) from the data. The features extracted may provide additional information in relation to the data related task, thereby improving the performance of the applied machine learning data analysis approach. Data analytics systems and solutions may provide multiple feature engineering templates that non expert users can apply to data, such as one-hot encoding, numerically encoding high cardinality categorical variables, and breaking down features. One-hot encoding may involve converting each category of a categorical feature into a new categorical column and for each row in the data assigning a binary value of 1 or 0 to the new columns depending on the value of the category for the categorical feature for each row. Once one-hot encoding is complete, the original categorical feature may be discarded. Breaking down features may involve creating several separate features. For example, a date feature can be separated into a day of the week, month, or year, or a Boolean variable indicating the day is a public holiday, etc.

Machine learning model building is another machine learning task that data analytic applications may enable non-expert users to utilize. Machine learning model building may involve selecting a primary feature from the prepared dataset (often referred to as the "target feature") and related features (often referred to as the "input features") for data analysis and a machine learning model build. Machine learning tasks such as classification and regression may be at the core of the data analysis. Certain data analytic solutions may automate the machine learning model building process. Once the target feature and input dataset are selected, the data analytic solution may automatically build several classification/regression models with the best model being selected based on metrics such as accuracy, robustness, and simplicity.

Interpretation of machine learning results is another machine learning task that data analytic applications may enable non-expert users to utilize. Interpretation of the results may include presenting a dashboard conveying an overview of the performance of the machine learning model in a digestible, interpretable format for non-expert users. Information may include a summary of the results, details of the input features with the strongest influence on the target of the machine learning model, and information on outliers in the data.

Through utilizing automated data processing tools and machine learning modelling functionality, non-expert users can utilize machine learning to explore and analyze data, thereby uncovering valuable insights. The insights and data results may then be translated into operational decisions.

As part of interpreting the machine learning model, a key component is understanding the weight of each input features' contribution—or influence—on the target feature. In determining a "feature contribution," a score may be assigned to each input feature, indicating the relative contribution of each feature towards the target feature. Feature contribution scores are advantageous as they may enable a better understanding of the data, better understanding of the learned model, and may reduce the overall number of input features since features with low contribution scores may be discarded.

A better understanding of the data may be provided by feature contribution scores, as the relative scores highlight the features most relevant to the target feature and also reveal the input features of least relevance. This insight can then be utilized, for example, as a basis for gathering additional data. Commonly owned application U.S. application Ser. No. 17/890,073, entitled "Feature Contribution Score Classification" to inventor Paul O'Hara is hereby incorporated by reference in its entirety.

Better understanding of the learned model may be provided by feature contribution scores as the contribution scores are calculated through interpreting a machine learning model built from a prepared dataset. Through inspection of feature contribution scores, insights into the built machine learning model's degree of dependency on each input feature when making a prediction can be achieved.

One may also reduce the number of input features by discarding features with low feature contribution scores. Reducing the number of input features may simplify the problem to be modelled, speed up the modelling process, and in some cases improves model performance.

Some challenges may arise when interpreting feature contribution scores for non-experts. For instance, numeric feature contribution scores may make it more challenging for non-experts to interpret. Also, the interpretation of the feature contribution scores may vary from model to model, which may be challenging for a non-expert user to correctly interpret. For example, a feature with 20% influence from a 5-input feature model should not be interpreted the same as a feature with a 20% influence from a 100-input feature model. That is, one feature having a 20% influence compared to 99 other features is more significant than one feature having a 20% influence compared to 4 other features.

Given the above considerations, there is a need for an intelligent solution that facilitates the efficient mapping of sets of machine learning feature contribution scores to accurate feature contribution labels (e.g., categorical labels). The mapped feature contribution labels may enable greater interpretation of machine learning feature contribution scores by non-expert users, facilitating insight discovery and decision making. Such an intelligent solution would be considered advantageous and desirable to organizations.

The present disclosure provides an automatic category classification framework (e.g., systems, computer programs, and methods) for feature contribution scores where the category classification for a set of feature contribution scores is accurately predicted against a set of predefined labels by an intelligent category classification component. Advantageously, the intelligent category classification process used within this framework may be model agnostic. That is, it is independent of the machine learning model from which the set of feature contribution scores are derived. This independence provides great flexibility enabling the feature contribution classification techniques for feature contribution scores to be applied against any machine learning model.

One advantage of mapping feature contribution scores to feature contribution labels is that the framework facilities increased model interpretability for the non-expert user. One advantage of labelling the feature contribution scores is that the framework ensures consistent interpretation by the user, reducing possible misinterpretation of similar contribution scores from feature contribution score sets of different sizes. This further facilitates understanding of a feature's contribution across multiple models allowing greater attention towards insight discovery.

The feature contribution category classification algorithm described herein enables accurate and consistent labelling of feature contribution scores from sets of various sizes. The model may take as input the feature contribution score, the size of the feature contribution set the contribution score is related to, and several configurable parameters, and outputs the category classification for the input feature contribution score from the set of predefined labels (categories) the model was trained against. With this technique there may be no limit on the number of category classification labels that can be defined.

The feature contribution classification framework described herein includes an algorithm optimization component, to ensure consistency and accuracy of the algorithm. The algorithm optimization component samples and applies historical feature contribution score sets against the feature contribution category classification algorithm. An expert in machine learning can verify the accuracy and consistency of the output. Within the algorithm optimization component, the configurable input parameters are efficiently optimized, addressing any identified behavioral issues, while increasing the accuracy and consistency of the algorithm output. Experiments demonstrate, through applying the optimization component, the algorithm achieved an average 91% category classification accuracy across several sample feature contribution score sets of varying sizes. Furthermore, the addition of the optimization process enables the framework to minimize the required number of feature contribution score sets required to obtain optimum performance, reducing the time-consuming procedure of acquiring and manually labelling a large dataset of feature contribution score sets.

The framework utilizes the optimized feature contribution category classification algorithm to classify and map new feature contribution score sets produced from a machine learning model to interpretable feature contribution category classification labels.

Therefore, the proposed framework, enables the optimization of a feature contribution category classification algorithm to efficiently and accurately classify feature contribution score sets to one of several interpretable feature contribution category classification labels.

Further features and advantages of the feature contribution classification techniques disclosed herein include a framework having a novel algorithm allowing an application to automatically, accurately, and efficient map feature contribution score sets to interpretable feature contribution classification labels; a framework that is machine learning model agnostic—enabling the framework to be applied against any machine learning model; a optimizable feature contribution category classification algorithm having as input a feature contribution score, feature contribution set size, configurable parameters and outputting an interpretable category classification label for the feature contribution score; a framework enabling an expert user to efficiently optimize the proposed novel feature contribution category classification algorithm increasing the accuracy and consistency of the algorithm output; and a framework ensuring consistent labelling, removing possible misinterpretation of similar contribution scores from feature contribution set of different sizes, facilitating feature intuitive understanding for non-machine learning experts.

The following terms used herein are defined as follows.

Feature: A feature is a measurable property of the data to be analyzed and/or predicted. In tabular datasets, each column may represent a feature.

Input Features: These represent the independent variables selected as the input to the machine learning model to be built.

Target Feature: The target feature represents the column of the dataset to be the focus of the machine learning model. The target feature is dependent on the input features. It is expected as the values of the independent features change, the value of the target feature will accordingly vary.

Machine Learning Model: A machine learning model is the output of a machine learning algorithm trained on an input dataset. The machine learning model represents what was learned by a machine learning algorithm and is used to make inferences/predictions on new data.

Feature Contribution Score: refers to techniques that assign a score to input features based on how they contribute to the prediction of a target feature. Feature contribution scores may play an important role in a machine learning modelling, providing insight into the data, insight into the model, and the basis for feature selection that can improve the efficiency and effectiveness of a machine learning model.

The feature contribution score category classification framework solution described herein can be applied to any set of feature contribution scores produced from a machine learning model. This enables non-machine learning experts to interpret the influence of input features on a target feature from a learned machine learning model where feature contributions scores are extracted. Through the application, the ability for a non-machine learning expert to consistently reasonably interpret feature contribution scores produced from models composed of differing feature set sizes is enhanced.

The feature contribution score category classification framework solution described herein may be implemented by a feature contribution classification computer system as described below with respect to FIG. 1.

A feature contribution score category classification computer system ("classification system") may be configured to implement the category classification techniques and framework described herein. FIG. 1 shows feature contribution score category classification system 110 in communication with a client system 150, according to an embodiment. The feature contribution score category classification system 110 of FIG. 1 may implement the techniques described below.

The feature contribution score category classification system 110 may comprise one or more server computers including one or more database servers. The feature contribution score category classification system 110 may provide a feature contribution score category classification software application 111 configured to optimize classification of feature contribution scores and configured to apply a feature contribution category classification algorithm 280 to a particular algorithm to obtain classifications as output 290. Feature contribution score category classification software application 111 may include feature contribution score label optimization element 230 and feature contribution score label application element 270. The feature contribution category classification application 111 may implement the solution described in detail below. In some embodiments feature contribution score category classification application 111 may be provided using a cloud-based platform or an on-premise platform, for example. Datasets for training the machine learning models and the models themselves may be stored in a database 117.

The client system 150 is connected to feature contribution score label application 111 and includes a client application 151. The client application 151 may be a software application or a web browser, for example. The client application 151 may be capable of rendering or presenting visualizations on a client user interface 152. The client user interface 152 may include a display device for displaying visualizations and one or more input methods for obtaining input from one or more users of the client system 150.

The client system 150 may communicate with the feature contribution score category classification system 110 (e.g., over a local network or the Internet). For example, the client application 151 may provide the historical input feature contribution score dataset 210.

Figure 2:
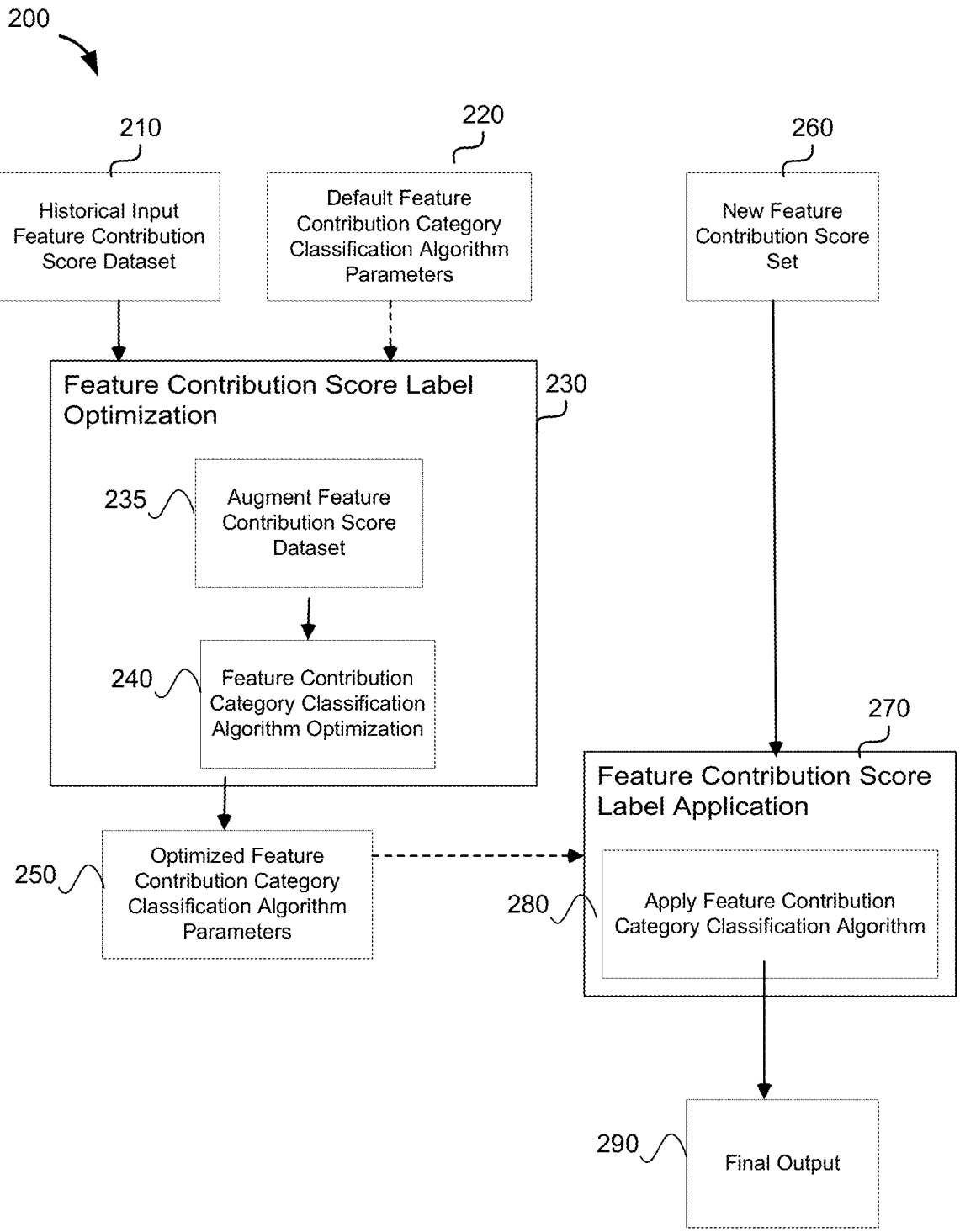
FIG. 2 illustrates an embodiment of a feature contribution score category classification system including feature contribution score label optimization component and feature contribution score label application component.

FIG. 2 illustrates an embodiment of a feature contribution score category classification system 200 to input datasets including of historical feature contribution score datasets. The system 200 includes feature contribution score label optimization element 230 and feature contribution score label application element 270.

The feature contribution score label optimization element 230 includes augment feature contribution score dataset component 235 and feature contribution category classification algorithm optimization component 240. Augment feature contribution score dataset component 235 takes as input the historical input feature contribution score dataset 210 and augments where realistic feature contribution score sets are materialized. Additional materialized feature contribution score sets can be added where deficits in the required number of samples of feature contribution score sets of various sizes were identified. The feature contribution score sets are materialized of multiple sizes with a required number of feature contribution score sets generated. The required number of feature contribution score sets is configurable. In an embodiment, the dataset can be augmented to ensure 200 feature contribution score sets are generated per feature contribution set size. In an embodiment, feature contribution sets sizes may range from 2 to 200.

The materialized feature contribution score sets are combined with the historical input feature contribution score dataset 210 producing the augmented feature contribution score dataset 350, where for each required feature contribution score set size a required number of examples exist. The augmented feature contribution score dataset 350 is then passed to the feature contribution category classification algorithm optimization component 240.

The feature contribution category classification algorithm optimization component 240 takes as inputs the augmented feature contribution score dataset 350, and the default feature contribution category classification algorithm parameters 220. The feature contribution category classification algorithm optimization component 240 randomly samples the augmented feature contribution score dataset 350 and applies an optimization routine. The optimization routine updates the default feature contribution category classification algorithm parameters 220 to values that result in the application of the feature contribution category classification algorithm against the sampled augmented feature contribution score datasets 350, consistently assigning category classifications that an expert in machine learning would define as reasonable. The feature contribution category classification algorithm optimization component 240 utilizes the augmented feature contribution score dataset component 235 to optimize the default feature contribution category classification algorithm parameters 220 ensuring the output category classifications from the feature contribution category classification algorithm are consistently reasonable and accurate. The output is optimized feature contribution category classification algorithm parameters 250. The output optimized feature contribution category classification algorithm parameters 250 are then passed to the feature contribution score label application element 270.

The feature contribution score label application element 270 includes apply feature contribution category classification algorithm component 280. The apply feature contribution category classification algorithm component 280 takes as input a new feature contribution score set 260 and optimized feature contribution category classification algorithm parameters 250. The size of the new feature contribution score set 260 is derived, and the apply feature contribution category classification algorithm component 280 receives as inputs the size of the new feature contribution score set 260 and the optimized feature contribution category classification algorithm parameters 250. The apply feature contribution category classification algorithm component 280 proceeds to classify the feature contribution scores of the new feature contribution score set 260 against a predefined set of available categories.

The output 290 is feature contribution score category classifications for each feature contribution score set item of a new feature contribution score set 260 that clearly and intuitively communicate to non-expert users for each feature contribution score set item, the strength of contribution towards a selected target feature. Thus, ensuring non-expert machine learning users can consistently interpret the influence of input features on a selected target feature from a learned machine learning model of differing feature set sizes where feature contributions scores are extracted.

Figure 3:
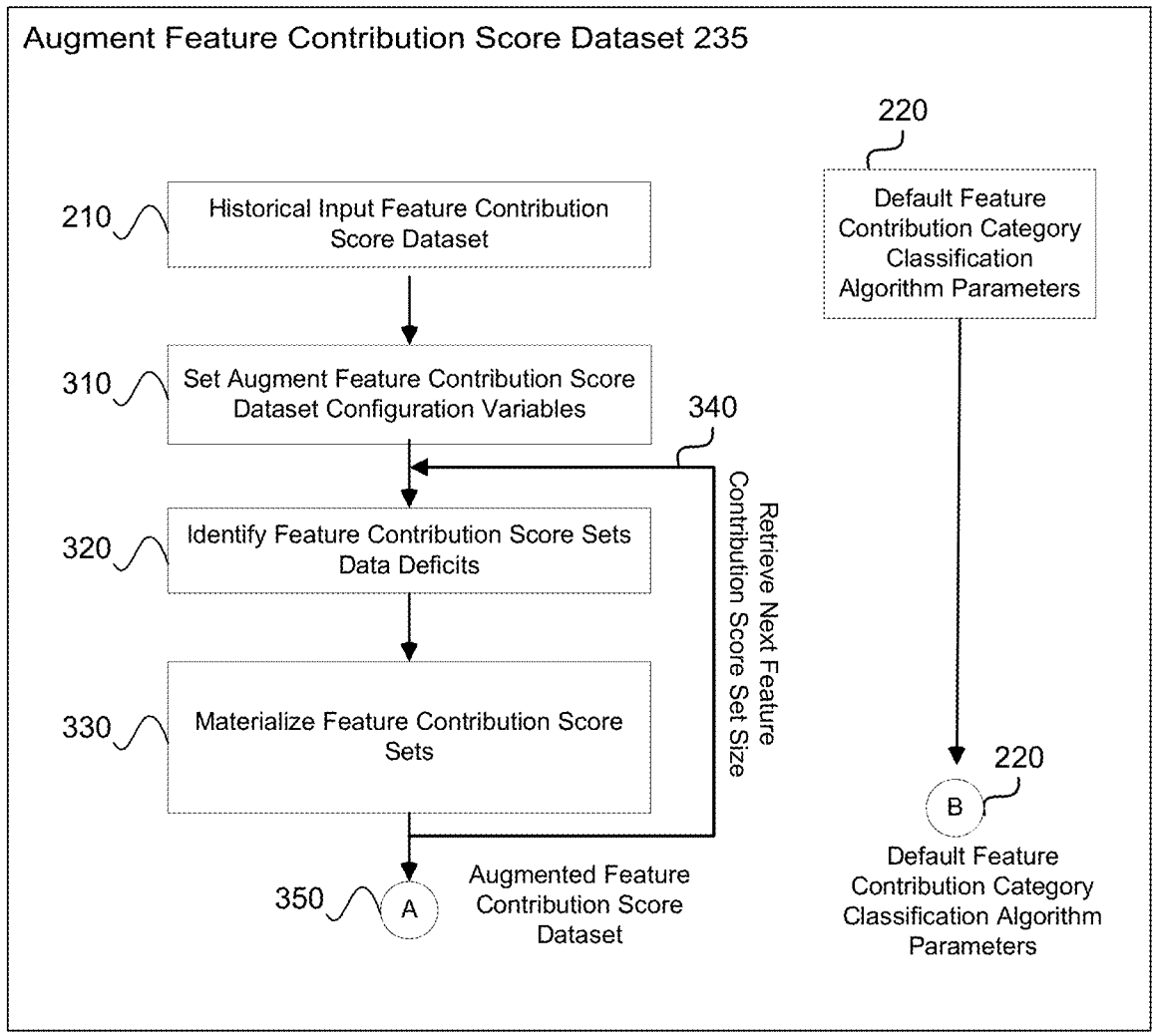
FIG. 3 illustrates augmenting the feature contribution score dataset within the label optimization component of FIG. 2.

As shown in FIG. 3, historical input feature contribution score dataset 210 is passed to the augment feature contribution score dataset component 235. The historical input feature contribution score dataset 210 represents historical feature contribution scores sets output from previously trained machine learning models. In an embodiment, historical input feature contribution score dataset 210 is structured and presented in tabular form. Within the tabular format, columns may represent information regarding a feature contribution score and rows may hold the values of these features relative to their respective columns.

In an embodiment, the columns of historical input feature contribution score dataset 210 represent continuous and categorical data. A continuous feature denotes numeric data having an infinite number of possible values within a selected range. An example of a continuous feature would be temperature. A categorical feature denotes data containing a finite number of possible categories. The data may or may not have a logical order. Examples of categorical data include days of the week, gender, unique identifier, etc.

In an embodiment, the historical input feature contribution score tabular dataset consists of three columns, which are: feature contribution score set identifier, score and set size. The feature contribution score set identifier is a unique identifier indicating the feature contribution score set the feature contribution score exists in relation to. The score is the feature contribution score, indicating the level of influence the feature has on the target feature. The set size is a number indicating the size (number of features) of the feature contribution set that exists in relation to the feature contribution score.

First the augment feature contribution score configurations are set at step 310. The system 200 defines configurations (number of feature contribution score sets per feature set size, feature contribution score set size range) outlining the required number of feature contribution score sets per feature contribution score set size, and range of feature contribution set sizes for which samples must exist. In an embodiment, the dataset was augmented to ensure 200 feature contribution score sets are generated per feature contribution set size with feature contribution sets sizes preferably configured to range from 2 to 200.

Then, for each defined feature contribution score set size, all feature contribution score sets of that size are retrieved from historical input feature contribution score dataset 210. Utilizing the retrieved historical input feature contribution score records, the required number of feature contribution score sets per feature set size configuration is accessed and the deficit between the number of feature contribution score sets existing for the current size and required number of feature contribution score sets calculated a step 320. If a deficit exists, the feature contribution score set sampler algorithm 420 is applied, and additional feature contribution score sets are materialized at step 330. At step 340, the next feature contribution score set size is retrieved and the process returns to steps 320 and 330 until there are no further sets to retrieve.

Figure 4:
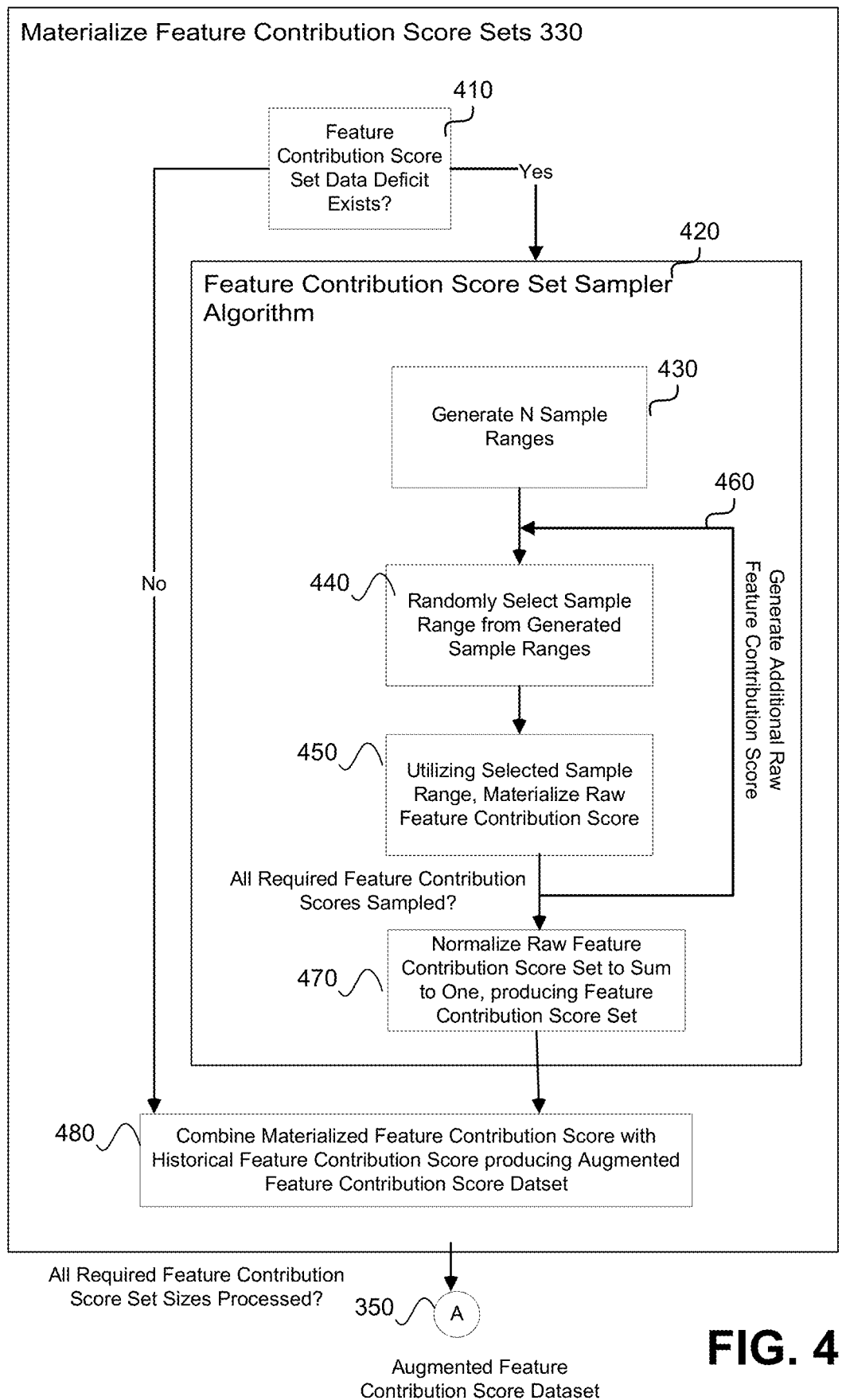
FIG. 4 illustrates materializing the feature contribution score sets with regard to augmenting the feature contribution dataset of FIG. 3.

Step 330 is detailed further in FIG. 4. As shown in FIG. 4, to materialize a feature contribution score set, the feature contribution score set sampler algorithm 420 generates n sample ranges (configuration property: number sample ranges) the raw feature contribution scores will be sampled from at step 430. Each sample range generated represents a range with a minimum value of 0.0 and maximum value produced through some random value generation process. The random value generation process can utilize any random value generation process with the only constraint that it must be positive and greater than 0. In an embodiment, the configuration property is set to 20, resulting in 20 sample ranges generated and the random value generation process producing maximum sample range values through sampling from a uniform distribution with values between 0 and 1. Then at step 440, for each required feature contribution score, a sample range is randomly selected with each sample range equally likely to be selected, and a raw feature contribution score materialized at 450. After the required number of feature contribution scores have been generated for the set, a function, such as a SoftMax function, is applied to the raw feature contribution score values normalizing all values to be between 0 and 1 and sum to 1. The result is a sample feature contribution score set whose values simulate a realistic feature contribution score set. The process is repeated at step 460 until sufficient feature contribution score sets exist for each defined score set size as described by the number of feature contribution score sets per feature set size configuration property.

In an embodiment, a first configuration property may be the number of feature contribution score sets per feature set size, which may be set at a default value of 200. However, this feature may be capable of being configured by a user. This first configuration property is defined as the required number of feature contribution score sets that must exist for each feature contribution score set size that is to be used when materializing the augmented feature contribution score dataset.

In an embodiment, a second configuration property may be the feature contribution score set size range, which may be set at 2-200. However, this feature may be capable of being configured by a user. This second configuration property is defined as the range of feature contribution score set sizes example must exist for when materializing the augmented feature contribution score dataset.

In an embodiment, a third configuration property may be the number of sample ranges, which may be set at 20. However, this feature may be capable of being configured by a user. This third configuration property is defined as the number of sample ranges to be generated from which the raw feature contribution scores will be sampled from, to be used as part of the feature contribution score set sample algorithm.

The materialized feature contribution score sets are combined with the historical input feature contribution score dataset producing the augmented feature contribution score dataset at step 480, where for each required feature contribution score set size the required number of feature contribution score sets exist. Once all required contribution score set sizes are processed, the augmented feature contribution score dataset 350 is then passed to the feature contribution category classification algorithm optimization component 240, as shown in FIG. 2.

Figure 5:
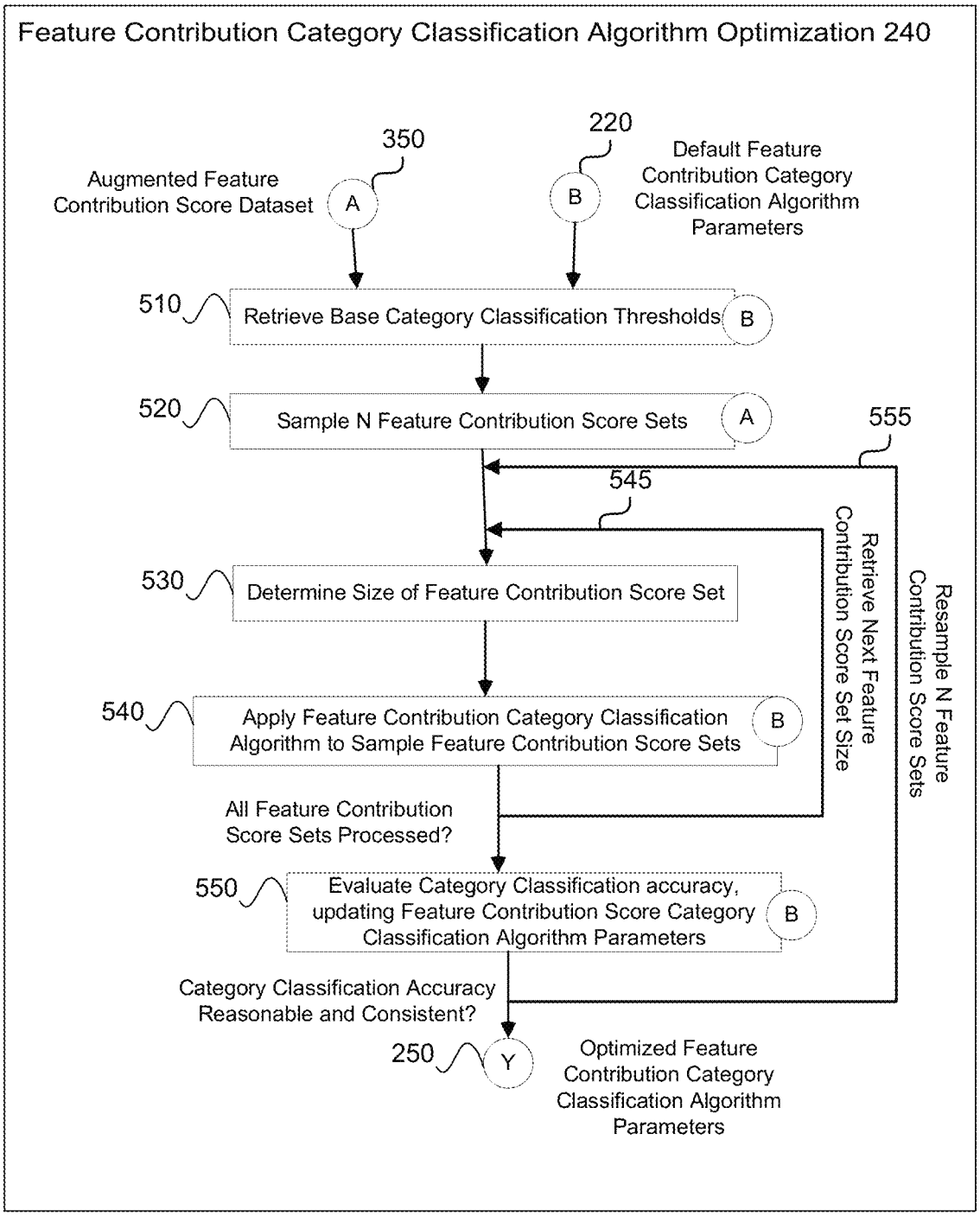
FIG. 5 illustrates algorithm optimization within the label optimization component of FIG. 2.

As shown in FIG. 5, the feature contribution category classification algorithm optimization component 240 takes as input the augmented feature contribution score dataset 350 and the default feature contribution category classification algorithm parameters 220. Using the feature contribution category classification algorithm parameters, the baseline category classification thresholds are instantiated at step 510. The number of baseline category classification thresholds to be instantiated is defined as n−1 the number of category classification labels. In an embodiment, three category classification labels are defined, Low, Moderate, and Strong, resulting in two category classification thresholds defined for category classification threshold augmentation. In an embodiment, baseline threshold values can be set to about 0.22 and about 0.5.

Then, from the augmented feature contribution score dataset 350, a sample of n feature contribution score sets are retrieved at step 520, where n is a configurable algorithm property (feature contribution score set sample size), representing the number of feature contribution score sets to be retrieved. In an embodiment, n is set to 100, though this is not restrictive, and any integer value is possible to be used. Then, for each sampled feature contribution score set, the size of the set is determined at step 530. At step 540, the feature contribution category classification algorithm is applied. After step 540, it is determined if all feature contribution score sets are processed. If yes, the process proceeds to step 550, as discussed further below. If no, at step 545, the next feature contribution score set size is retrieved and the process returns to perform steps 530 and 540.

Figure 6:
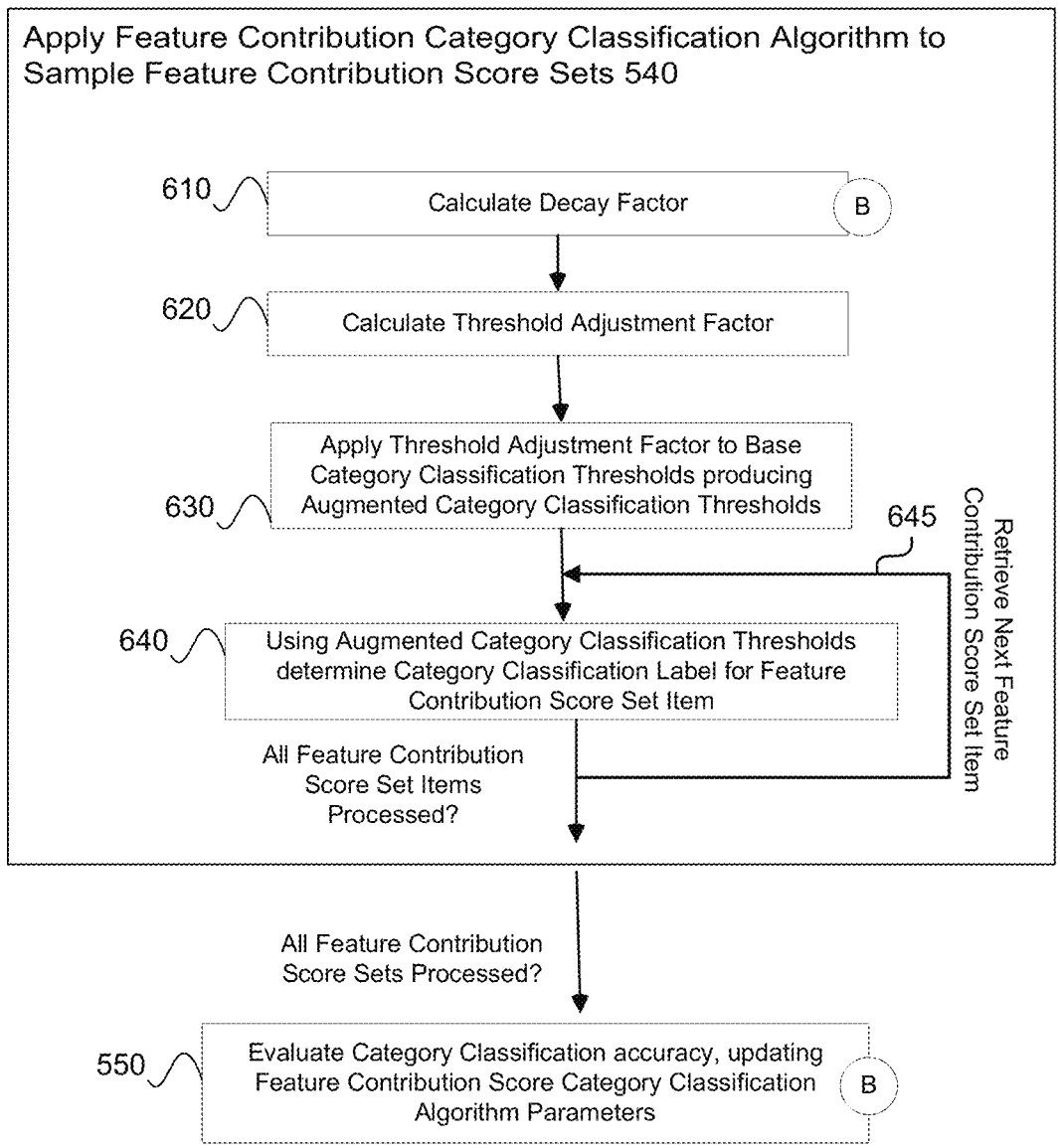
FIG. 6 illustrates applying the algorithm with regard to the algorithm optimization of FIG. 5.

Step 540 is detailed further in FIG. 6. As shown in FIG. 6, the application of the feature contribution category classification algorithm takes as input a sampled feature contribution score set from step 520, baseline category classification thresholds from step 510, the size of the feature contribution score set, and several additional configuration parameters.

Utilizing the size of the feature contribution score set and several feature contribution category classification algorithm parameters the decay factor is calculated at step 610. In an embodiment, the algorithm to produce the decay factor is defined as:

--- decayfactorcalculator (alpha, beta, $size_{feature\ contribution\ set}$, $min_{feature\ set\ size}$, $max_{feature\ set\ size}$, $min_{scale}$, $max_{scale}$)
  $expdecay_{feature\ set\ size}$ = expdecay ($size_{feature\ contribution\ set}$, alpha, beta)
  $expdecay_{max}$ = expdecay ($min_{feature\ set\ size}$, alpha, beta)
  $expdecay_{min}$ = expdecay ($max_{feature\ set\ size}$, alpha, beta)
  decayfactor = scaletominmax ($expdecay_{feature\ set\ size}$, $expdecay_{max}$, $expdecay_{min}$, $min_{scale}$, $max_{scale}$)
    expdecay (x, alpha, beta) = alpha * beta$^{-x}$ scaletominmax ($expdecay_{feature\ set\ size}$, $expdecay_{max}$, $expdecay_{min}$, $min_{scale}$, $max_{scale}$) = $\dfrac{expdecay_{feature\ set\ size} - expdecay_{min}}{expdecay_{max} - expdecay_{min}}$ *

($max_{scale} - min_{scale}$) + $min_{scale}$

---

In the above equations, alpha represents the default decay factor that is to be adjusted and scaled according to the size of the feature contribution set; beta represents a decay rate to adjust the default decay factor by before scaling to within the given maximum and minimum range; $size_{feature\ contribution\ set}$ represents the number of features contained within the feature contribution score set; $min_{feature\ set\ size}$ represents the minimum feature contribution size that considered reasonable to be expected; $max_{feature\ set\ size}$ represents the maximum feature contribution size that considered reasonable to be expected; $min_{scale}$ represents the minimum value the decay factor can be; and $max_{scale}$ represents the maximum value the decay factor can be.

The output decay factor is then used as input to calculate the threshold adjustment factor at step 620. The threshold adjustment factor represents a value, based on the feature contribution set size, and calculated decay factor used to adjust each threshold to a value that is considered, after expert analysis, to produce more reasonable category classifications for feature contribution scores of a given feature contribution score set size than if a fixed absolute threshold was applied. The algorithm to produce the threshold adjustment factor is:

threshold adjustment factor(decayfactor, $size_{feature\ contribution\ set}$)

$X = 2*(1/\log_e(size_{feature\ contribution\ set})$ threshold adjustment factor = $(2*g(x)-1)*$decayfactor $g(x) = e^*/(1+e^*)$ In the above equation, $size_{feature\ contribution\ set}$ represents the number of features contained within the feature contribution score set; and decayfactor represents the calculated decay factor.

In an example, alpha=1.17, which is the initial factor value to be first adjusted (based on feature set size parameters) and then scaled (based on the scale parameters) to produce the decay factor. In an example, beta=1.06, which is the decay rate to be applied in the adjustment of the initial factor value and feature set size parameters before scaling to within the given maximum and minimum range. In an example, the $min_{feature\ set\ size}$ is 2 and the $max_{feature\ set\ size}$ is 1000. In an example, the $min_{scale}$ is 0.8 and $max_{scale}$ is 1.17, which represent the minimum and maximum values the decay factor can be.

At step 630, the output threshold adjustment factor is used to augment the base category classification thresholds, producing the augmented category classification thresholds reflecting reasonable thresholds based on the size (number of features) of the feature contribution score set. Then, for each feature contribution score set item of the feature contribution score set, the output augmented category classification thresholds are then utilized as the category classification thresholds and the feature contribution score set items classified and mapped to category classification labels at step 640. The algorithm to produce the augmented category classification threshold vector is: augmented category classification threshold=base category classification threshold*threshold adjustment factor. Base category classification threshold represents a vector of baseline thresholds to be adjusted, and threshold adjustment factor represents a scalar to be used to the adjustment of the baseline category classification thresholds.

After step 640, it is determined if all feature contribution score set items are processed. If not, at step 645 the next feature contribution score set item is retrieved and steps 630 and 640 are repeated. Once all feature contribution score sets in the sample are classified, the classification accuracy of the classified feature contribution score set sample is analyzed at step 550 and the feature contribution category classification algorithm parameters are updated accordingly. The optimization process is then repeated at step 555 until a reasonable classification accuracy level is achieved. The output optimized feature contribution category algorithm parameters 250 is then utilized by the feature contribution score label application component 270, referring back to FIG. 2.

Figure 7:
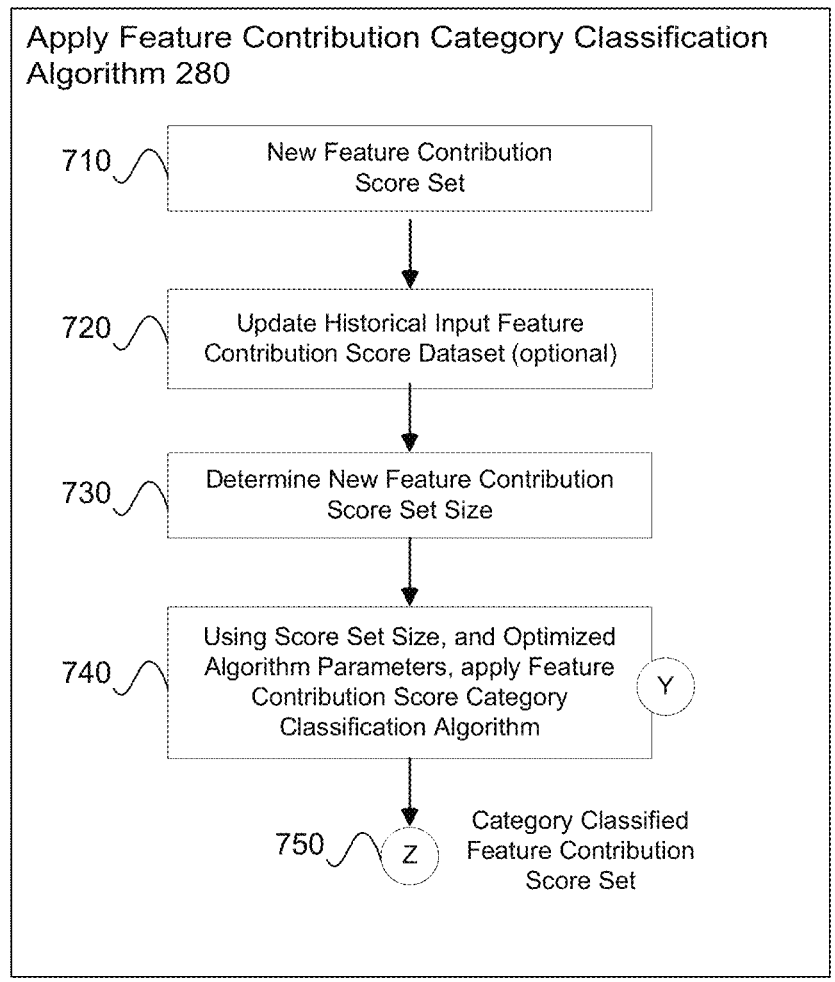
FIG. 7 illustrates applying the algorithm within the label application component of FIG. 2.

As shown in FIG. 7, based on the feature contribution score category classification process, a new feature contribution score set is accepted at step 710 with the same data structure as outlined in the feature contribution score label optimization process. This enables each feature contribution score set item of the new feature classification score set to be classified and mapped to a respective category classification label.

At step 720, the historical input feature contribution score dataset is then optionally updated to include the new feature contribution score set. At step 730, the size of the new feature contribution score set is determined. Then at step 740, using the determined feature contribution score set size, and optimized feature contribution category classification algorithm parameters, the feature contribution category classification algorithm is applied where category classification thresholds are materialized and utilized to classify and assign appropriate category classification labels to each feature contribution score set item contained within the new feature contribution score set.

Consequently, as output 750, a feature contribution score set is produced where each feature contribution score set item has a category classification label assigned, intuitively informing the strength of its contribution towards a selected target feature. Thus, the feature contribution score category classification system described herein solves the feature contribution score set classification labelling problem.

The feature contribution score category classification system 200 can be applied in any application where labelling of feature contribution scores to interpretable human readable category classification labels is required. In an embodiment, the system 200 can be applied to application 151, which may be an application such as SAC (SAP Analytics Cloud)—Smart Discovery. System 200 may be used to provide data for a key influencer functionality. In an embodiment, the output feature contribution scores from a machine learning model are required to be mapped to intuitive human readable classification labels.

Application 151 represents the result generated by executing a machine learning algorithm to uncover new or unknown relationships between columns within a dataset. Application 151 may provide an overview of a dataset by automatically building charts to enable information discovery from the data.

As part of the output of application 151, key influencers are displayed in a user interface 152. The key influencers are the top ranked features of the dataset that significantly impact the selected target of the application 151. For each listed key influencer, there exist specific information panels to illustrate the relationship between the influencer and the target. An exemplary information panel is shown in FIG. 8A. In an embodiment, specific information panel is a table 830 where the feature contribution scores are classified with category classification labels 852 assigned. This is where the output from system 200 is applied. Table 830 may include a graphical representation of the amount of influence, such as shown by icons in column 832. Table 830 may also include column 834 indicating the influence of each factor, such as by strong, moderate, or weak/low labels. Table 830 may also include a column 836 listing the factors, and a column 838 listing the correlations between the influencer and the target.

As shown in FIG. 8A, the labelled feature contribution score panel classified the underlying feature contribution scores of the feature contribution score items based on the application of absolute thresholds 854, as shown in table 850 of FIG. 8B, with three category classification labels 852 existing. The absolute threshold approach fails to consider the size of the feature contribution size, often resulting in poor labelling of feature contribution scores. The feature contribution score category classification system 200 addresses this concern through enabling dynamic thresholds to be materialized based on the size of the feature contribution score set.

In the application of feature contribution score category classification system 200, the performance was compared against the application of absolute thresholds, where three category classification labels exist as shown in table 850.

With respect to FIG. 9, as shown in table 900, an exemplary simulated historical input feature contribution score dataset 210 is shown containing two feature contribution score sets (A1, B1) with expected category classification labels assigned. Table 900 may include feature contribution score set ID 910, contribution score 920, contribution score set size 930, expected classification 940, absolute threshold application classification 950, and applied algorithm classification 960.

As shown in FIG. 9, table 900, the application of the absolute thresholds on the historical input feature contribution score dataset 210 results in the correct classification for feature contribution score set A1 in 3 of the 4 feature contributions score, producing an overall accuracy of 75%. For feature contribution score set B1, the application of absolute thresholds correctly classifies 8 of the 15 the feature contribution score set, producing an accuracy of 53%. This can be seen by comparing column 940 and column 950. Furthermore, for feature contribution score set B1 the absolute thresholds direction failed to correctly classify all expected Moderate and Strong category classification labels. This behavior re-enforces the requirement for a solution enabling dynamic category classification thresholds based on feature contribution score set size to exist.

In this application, the feature contribution score category classification system 200 is applied utilizing the historical input feature contribution score dataset 210 as defined in table 900 as input, and default feature contribution category classification algorithm parameters 220. The feature contribution category classification algorithm parameters can be adjusted by an expert to optimize the performance of the algorithm. In an embodiment, the alpha and beta parameters are optimized.

In an embodiment, the system is configured to consist of 200 sample feature contribution score sets per defined feature set size. The defined feature contribution set sizes may range from 2 through to 20, and then 25, 30, 35, 40, 45, 50, 60, 70, 80, 90, 100, 110, 120, 130, 140, 150, 160, 170, 180, 190, and 200.

To meet this configuration a synthetic dataset consisting of realistic feature contribution score sets consisting of 200 sample feature contribution score sets per feature set size for the defined contribution set sizes is materialized. For each feature contribution score set of the synthetic dataset an expert in machine learning has classified each feature contribution score item as one of the available category classification labels as defined by the feature contribution category classification algorithm parameters, which are: Low; Moderate; and Strong. In some embodiments, these labels may be defined or customized by a user, and more or fewer label categories may be provided. For instance, "Low" may be "Weak" or another user-defined term.

Thus, the historical input feature contribution score dataset 210 is inspected, and for each required feature set size, the deficit between the historical input feature contribution score dataset 210 and the required number of samples identified with the required number of sample feature contribution score sets selected from the synthetic feature contribution score dataset and combined with the historical input feature contribution score dataset 210 producing augmented feature contribution score set dataset 350.

Using the augmented feature contribution score set dataset 350 and default feature contribution category classification algorithm parameters 220, the feature contribution category classification algorithm is applied, and the parameters are optimized.

With the parameters optimized, feature contribution score sets classification label thresholds can be derived for feature contribution sets utilizing the feature contribution category classification algorithm. As shown in FIG. 8C, table 870, the feature contribution category classification algorithm is applied using the optimized parameters and historical input feature contribution score datasets 210 as input and feature contribution score sets classification label thresholds 876 are derived. Table 870 shows a feature contribution score set size 872, a category classification label 874, and a derived threshold 876.

Subsequently, as shown in FIG. 9, table 900, the thresholds derived as part of the feature contribution category classification algorithm are applied and the feature contribution score sets classified and labelled accordingly. The results demonstrate greater accuracy than if absolute thresholds are applied, achieving 100% category classification accuracy for the A1 and B1 feature contribution score sets, as seen in column 960 as compared to column 940.

As shown in FIG. 10, table 1000, the results from the comparison of the application of the feature contribution category classification algorithm 1006 and the absolute fixed thresholds 1008 against the augmented feature contribution score dataset as labelled by an expert user are displayed. The results indicate an average accuracy of 91% for the feature contribution category classification algorithm, shown in column 1006, displaying a significant improvement over the absolute fixed threshold application, shown in column 1008 (average accuracy 74%). Furthermore, the feature contribution category classification algorithm maintains a consistent accuracy across all feature set sizes with a standard deviation of 4.91%, while the absolute fixed threshold application presents a standard deviation of 15.21%.

FIG. 11, table 1100, displays the results from the comparison of the application of the feature contribution category classification algorithm and the absolute fixed thresholds against the augmented feature contribution score dataset for the category classification label "Low". Table 1100 may display feature contribution set size in column 1102, the accuracy of the applied algorithm in column 1104, the accuracy for the absolute threshold in column 1106, and the algorithm compared to the threshold in column 1108. The results indicate an average accuracy of 98% for the feature contribution category classification algorithm and average accuracy of 99% for the applied absolute thresholds. This indicates equivalent high accuracy and performance be achieved with each approach for the category classification label, "Low".

FIG. 12, table 1200, displays the results from the comparison of the application of the feature contribution category classification algorithm and the absolute fixed thresholds against the augmented feature contribution score dataset for category classification label, "Moderate". Table 1200 may display feature contribution set size in column 1202, the accuracy of the applied algorithm in column 1204, the accuracy for the absolute threshold in column 1206, and the algorithm compared to the threshold in column 1208. The results indicate an average accuracy of 53.48% for the feature contribution category classification algorithm and average accuracy of 9.92% for the applied absolute thresholds. This indicates reasonable accuracy was achieved for the algorithm approach, and poor accuracy achieved for the absolute threshold approach. Furthermore, the comparison demonstrates superior accuracy and performance is consistently achieved by the feature contribution category classification algorithm across all feature contribution score set sizes for the category classification label, "Moderate".

Figure 13:
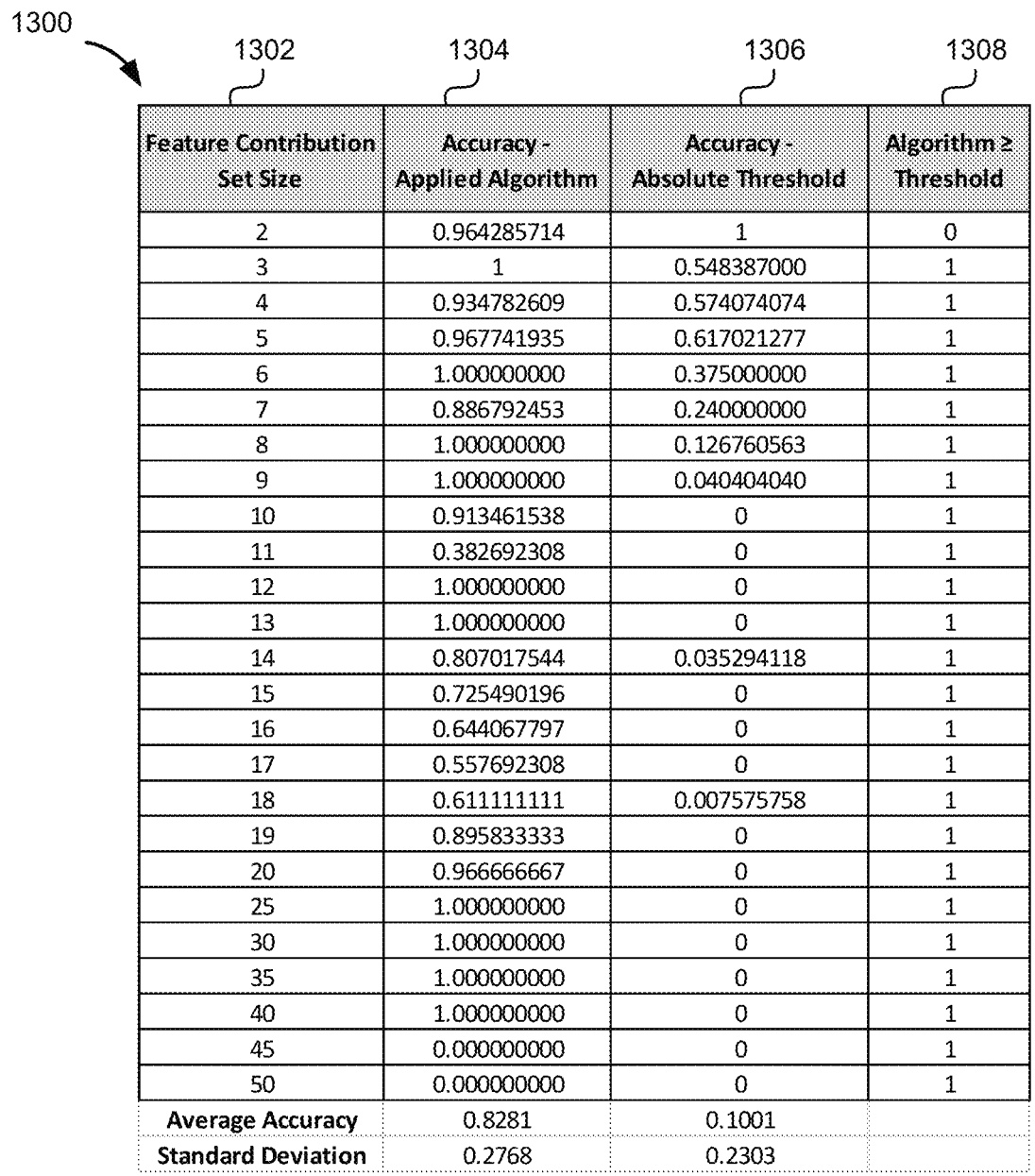
FIG. 13 displays the results from the example comparison of the application of the feature contribution category classification algorithm and the absolute fixed thresholds against the augmented feature contribution score dataset for category classification label "Strong".

FIG. 13, table 1300, displays the results from the comparison of the application of the feature contribution category classification algorithm and the absolute fixed thresholds against the augmented feature contribution score dataset for category classification label "Strong". Table 1300 may display feature contribution set size in column 1302, the accuracy of the applied algorithm in column 1304, the accuracy for the absolute threshold in column 1306, and the algorithm compared to the threshold in column 1308. The category classification "Strong" existed as a labelled category in the Feature Contribution Score Dataset for 25 feature contribution set sizes. For feature contribution score set sizes greater than 50, no feature contribution score was classified with a Category Classification Label of "Strong". The results indicate an average accuracy of 82.81% for the feature contribution category classification algorithm and average accuracy of 10.01% for the applied absolute thresholds. This indicates high accuracy was achieved for the algorithm approach, with poor accuracy achieved for the absolute threshold approach. Furthermore, the comparison demonstrates superior accuracy and performance is achieved by the feature contribution category classification algorithm across 24 of the 25-feature contribution score set sizes for the classification of the category classification label "Strong" with negligible difference existing between the high accuracies—96% vs 100%—for the feature contribution score set size, 2, where the absolute threshold managed marginally higher accuracy.

Through following the feature contribution score category classification system, feature contribution score sets can have category classification labels assigned with greater accuracy, while continuing to provide intuitive interpretation to non-expert users. The ability to reliably label feature contribution scores produced from some machine learning model as intuitive human readable labels with high accuracy is seen as greatly helpful in decision making.

In an embodiment, an exemplary target feature of a machine-learning model may be the price of a house. Input features may include many characteristics related to the house such as: size of the yard, square feet of the house, number of bedrooms, number of bathrooms, location, etc. One may want to determine how much each feature contributes to the final target result. If there was a model having 5 feature inputs and one feature had a 20% influence, this feature may have a low influence on the model. However, compared to a model having 100 feature inputs, one feature having a 20% influence would be much more important. Thus the percentage is based both on the importance of the input feature itself and the number of input features in the model.

In an embodiment, an exemplary target feature of a machine-learning model may be employee churn rate. Input features may be: number of years of service, gender, age, last promotion date, etc. These feature contribution numbers may then be interpreted to labels such as weak, moderate, strong labels.

In an embodiment, an exemplary target feature of a machine-learning model may be a delivery date prediction, such as a number of days. Input features may be: product size, product weight, delivery source location, delivery destination location, distance for delivery, method of delivery, etc. The percentage is based both on the importance of the feature itself and the number of input features in this regression model.

In an embodiment, an exemplary target feature of a machine-learning model may be how many days left of inventory of a product. In another embodiment, an exemplary target of a machine-learning model may be the amount of time to a destination, such as used in a mapping application. Other target features may be programmed into a machine-learning model, such as desired by a user, each with associated input features having respective contribution scores. The system disclosed herein can assign category labels and present the labels to a user to assist the user in determining the importance of each input feature.

Figure 14:
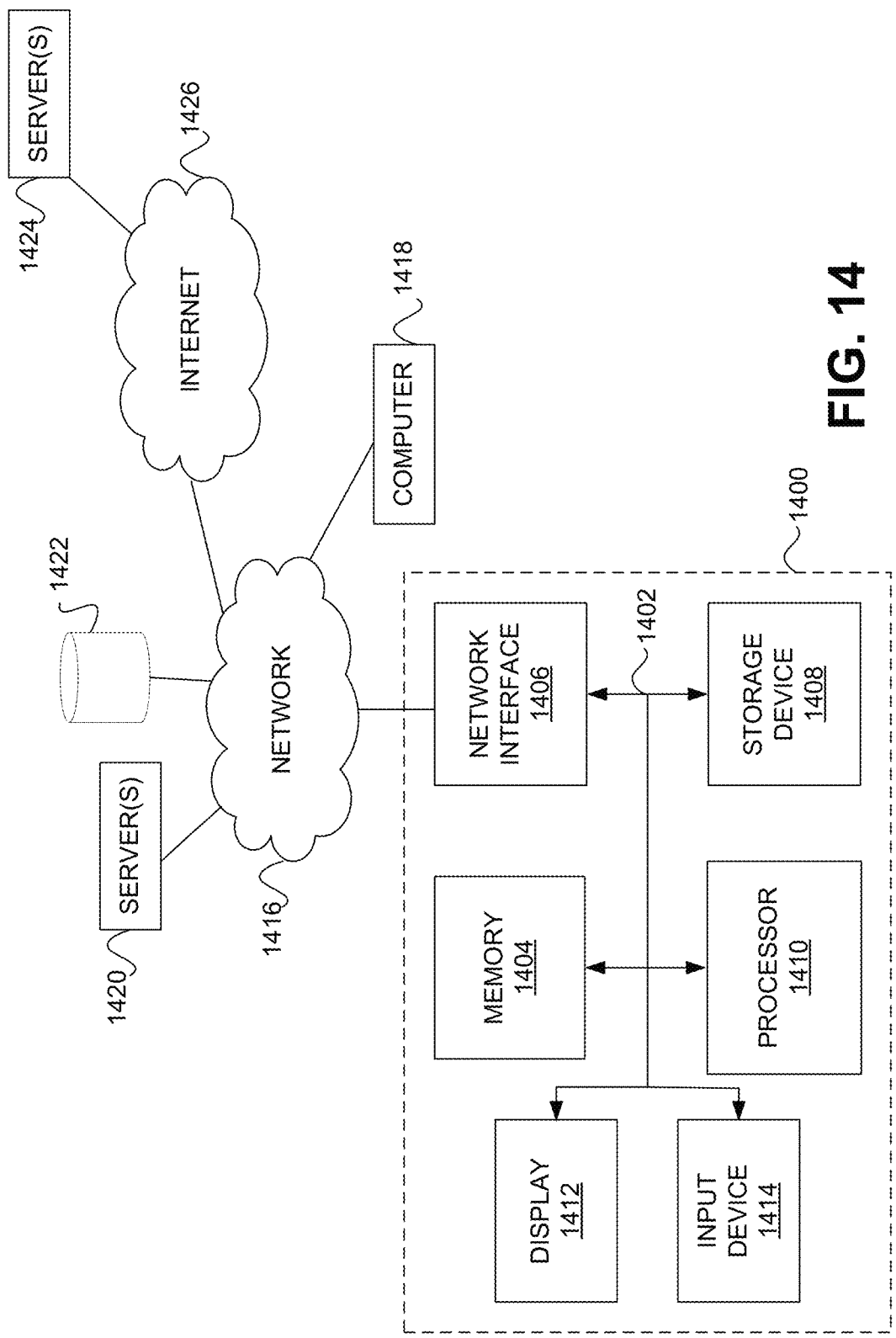
FIG. 14 is a diagram illustrating a sample computing device architecture for implementing various aspects described herein.

FIG. 14 is a diagram illustrating a sample computing device architecture for implementing various aspects described herein. Computer 1400 can be a desktop computer, a laptop computer, a server computer, a mobile device such as a smartphone or tablet, or any other form factor of general- or special-purpose computing device containing at least one processor. Depicted with computer 1400 are several components, for illustrative purposes. Certain components may be arranged differently or be absent. Additional components may also be present. Included in computer 1400 is system bus 1402, via which other components of computer 1400 can communicate with each other. In certain embodiments, there may be multiple busses or components may communicate with each other directly. Connected to system bus 1402 is processor 1410. Also attached to system bus 1402 is memory 1404. Also attached to system bus 1402 is display 1412. In some embodiments, a graphics card providing an input to display 1412 may not be a physically separate card, but rather may be integrated into a motherboard or processor 1410. The graphics card may have a separate graphics-processing unit (GPU), which can be used for graphics processing or for general purpose computing (GPGPU). The graphics card may contain GPU memory. In some embodiments no display is present, while in others it is integrated into computer 1400. Similarly, peripherals such as input device 1414 is connected to system bus 1402. Like display 1412, these peripherals may be integrated into computer 1400 or absent. Also connected to system bus 1402 is storage device 1408, which may be any form of computer-readable media, such as non-transitory computer readable media, and may be internally installed in computer 1400 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 1406 is also attached to system bus 1402 and allows computer 1400 to communicate over a network such as network 1416. Network interface 1406 can be any form of network interface known in the art, such as Ethernet, ATM, fiber, Bluetooth, or Wi-Fi (i.e., the Institute of Electrical and Electronics Engineers (IEEE) 802.11 family of standards). Network interface 1406 connects computer 1400 to network 1416, which may also include one or more other computers, such as computer 1418, and network storage, such as cloud network storage. Network 1416 is in turn connected to public Internet 1426, which connects many networks globally. In some embodiments, computer 1400 can itself be directly connected to public Internet 1426.

In some embodiments, a machine learning model is provided in the context of a computer hardware and software architecture environment. In an embodiment, machine learning may include supervised learning and/or unsupervised learning. Supervised learning is defined by labeled datasets that are used to train algorithms into classifying data and/or predicting outcomes. Supervised learning may include classification algorithms and regression algorithms. Classification algorithms may include linear classifiers, support vector machines, decision trees, and random forest. Regression models include linear regression, logistic regression, and polynomial regression.

Unsupervised learning models may be used for determining hidden patterns in data and include clustering, association, and dimensionality reduction. Clustering techniques assign similar data points into groups. The association method uses rules to find relationships between variables in a dataset. Dimensionality reduction may be used to reduce the number of data points to a manageable size when the number of features in a dataset is too large. In an embodiment, the knowledge graph model may provide an input into an unsupervised machine learning model. Such an unsupervised machine learning model may provide insights from the new data that were not contemplated by the user.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although described with reference to the embodiments illustrated in the attached drawing figures, it is noted that equivalents may be employed, and substitutions made herein without departing from the scope as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects in sufficient detail to enable those skilled in the art to practice the embodiments. Other embodiments can be utilized, and changes can be made without departing from the claimed scope. The following detailed description is, therefore, not to be taken in a limiting sense. The scope of embodiments is defined only by the appended claims, along with the full scope of equivalents to which such claims are entitled.

Having thus described various embodiments, what is claimed as new and desired to be protected by Letters Patent includes the following:

1. One or more non-transitory computer-readable media storing computer-executable instructions that, when executed by at least one processor, perform a method for applying category classification labels to a new feature contribution score dataset, the method comprising:
   obtaining a plurality of historical feature contribution score (FCS) datasets, each historical FCS dataset comprising a first plurality of feature contribution scores and a size of the historical FCS dataset,
   applying default feature contribution category classification (FCCC) parameters to the plurality of historical FCS datasets;
   optimizing the default FCCC parameters to produce a plurality of optimized FCCC parameters;
   producing a training dataset comprising the optimized FCCC parameters;
   using the training dataset to train a machine learning model to apply the category classification labels;
   applying the new FCS dataset to the machine learning model, the new FCS dataset comprising a second plurality of feature contribution scores and a size of the new FCS dataset; and
   providing the category classification labels for the new FCS dataset to a user interface.

2. The non-transitory computer-readable media of claim 1, wherein when the number of historical datasets is less than a threshold for a given size of the historical FCS dataset, further comprising:
   creating a plurality of materialized feature contribution score datasets, each materialized FCS dataset comprising a third plurality of scores and a size of the materialized FCS dataset;
   combining the historical FCS datasets with the materialized FCS datasets to produce a plurality of augmented FCS datasets; and
   applying the default FCCC parameters to the plurality of augmented FCS datasets.

3. The non-transitory computer-readable media of claim 1, wherein a feature contribution score indicates the importance of an input feature to a target feature of the machine-learning model.

4. The non-transitory computer-readable media of claim 1, wherein optimizing the default feature contribution category classification parameters comprises:
   retrieving base category classification thresholds;
   sampling a plurality of FCS datasets to determine the size of the FCS dataset; and
   producing augmented category classification thresholds.

5. The non-transitory computer-readable media of claim 1, wherein the category classification labels are customizable by a user for display on the user interface.

6. The non-transitory computer-readable media of claim 1, wherein the category classification labels are model agnostic.

7. The non-transitory computer-readable media of claim 1, wherein the size of the new FCS dataset is in the range of 2 to 200.

8. A method for applying category classification labels to a new feature contribution score dataset, the method comprising:
   obtaining a plurality of historical feature contribution score (FCS) datasets, each historical FCS dataset comprising a first plurality of feature contribution scores and a size of the historical FCS dataset,
   applying default feature contribution category classification (FCCC) parameters to the plurality of historical FCS datasets;
   optimizing the default FCCC parameters to produce a plurality of optimized FCCC parameters;
   producing a training dataset comprising the optimized FCCC parameters;
   using the training dataset to train a machine learning model to apply the category classification labels;
   applying the new FCS dataset to the machine learning model, the new FCS dataset comprising a second plurality of feature contribution scores and a size of the new FCS dataset; and
   providing the category classification labels for the new FCS dataset to a user interface.

9. The method of claim 8, wherein when the number of historical datasets is less than a threshold for a given size of the historical FCS dataset, further comprising:
   creating a plurality of materialized feature contribution score datasets, each materialized FCS dataset comprising a third plurality of scores and a size of the materialized FCS dataset;
   combining the historical FCS datasets with the materialized FCS datasets to produce a plurality of augmented FCS datasets; and
   applying the default FCCC parameters to the plurality of augmented FCS datasets.

10. The method of claim 8, wherein a feature contribution score indicates the importance of an input feature to a target feature of the machine-learning model.

11. The method of claim 8, wherein optimizing the default feature contribution category classification parameters comprises:
   retrieving base category classification thresholds;
   sampling a plurality of FCS datasets to determine the size of the FCS dataset; and
   producing augmented category classification thresholds.

12. The method of claim 8, wherein category classification labels are customizable by a user for display on the user interface.

13. The method of claim 8, wherein the plurality of category classification labels are model agnostic.

14. The method of claim 8, wherein the size of the new FCS dataset is in the range of 2 to 200.

15. A system for applying category classification labels to a new feature contribution score dataset, the system comprising:

at least one processor;

and at least one non-transitory memory storing computer executable instructions that when executed by the at least one processor cause the system to carry out actions comprising:

obtaining a plurality of historical feature contribution score (FCS) datasets, each historical FCS dataset comprising a first plurality of feature contribution scores and a size of the historical FCS dataset, applying default feature contribution category classification (FCCC) parameters to the plurality of historical FCS datasets;

optimizing the default FCCC parameters to produce a plurality of optimized FCCC parameters;

producing a training dataset comprising the optimized FCCC parameters;

using the training dataset to train a machine learning model to apply the category classification labels;

applying the new FCS dataset to the machine learning model, the new FCS dataset comprising a second plurality of feature contribution scores and a size of the new FCS dataset; and providing the category classification labels for the new FCS dataset to a user interface.

16. The system of claim 15, wherein when the number of historical datasets is less than a threshold for a given size of the historical FCS dataset, further comprising:

creating a plurality of materialized feature contribution score datasets, each materialized FCS dataset comprising a third plurality of scores and a size of the materialized FCS dataset;

combining the historical FCS datasets with the materialized FCS datasets to produce a plurality of augmented FCS datasets; and applying the default FCCC parameters to the plurality of augmented FCS datasets.

17. The system of claim 15, wherein a feature contribution score indicates the importance of an input feature to a target feature of the machine-learning model.

18. The system of claim 15, wherein optimizing the default feature contribution category classification parameters comprises:

retrieving base category classification thresholds;

sampling a plurality of FCS datasets to determine the size of the FCS dataset; and producing augmented category classification thresholds.

19. The system of claim 15, wherein the category classification labels are model agnostic.

20. The system of claim 15, wherein the size of the new FCS dataset is in the range of 2 to 200.

* * * * *